(12) United States Patent
Ryu

(10) Patent No.: US 7,783,039 B2
(45) Date of Patent: Aug. 24, 2010

(54) DIGITAL RECORDING DEVICE, DIGITAL REPRODUCTION DEVICE, DIGITAL RECORDING/REPRODUCTION DEVICE, ENCRYPTION DEVICE, DECRYPTION DEVICE, ENCRYPTION METHOD, AND DECRYPTION METHOD

(75) Inventor: Tomoaki Ryu, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 995 days.

(21) Appl. No.: 10/566,728

(22) PCT Filed: Jul. 16, 2004

(86) PCT No.: PCT/JP2004/010218

§ 371 (c)(1),
(2), (4) Date: Feb. 2, 2006

(87) PCT Pub. No.: WO2005/013273

PCT Pub. Date: Feb. 10, 2005

(65) Prior Publication Data

US 2006/0210074 A1   Sep. 21, 2006

(30) Foreign Application Priority Data

Aug. 4, 2003  (JP) .............................. 2003-285689

(51) Int. Cl.
*H04L 9/00* (2006.01)
(52) U.S. Cl. .............................. 380/59; 380/200; 710/56
(58) Field of Classification Search .................. 380/54, 380/59, 200, 201; 710/52, 56
See application file for complete search history.

(56) References Cited

U.S. PATENT DOCUMENTS

| 4,368,357 A | * | 1/1983 | Gurak | 380/2 |
| 4,907,275 A | * | 3/1990 | Hashimoto | 713/161 |
| 5,303,302 A | * | 4/1994 | Burrows | 713/161 |

(Continued)

FOREIGN PATENT DOCUMENTS

JP    5-257816 A    10/1993

(Continued)

OTHER PUBLICATIONS

Nakane, K.; Sato, Y.; Kiyose, Y.; Shimamoto, M.; Ogawa, M., "Development of combined HDD and recordable-DVD video recorder," Consumer Electronics, 2002. ICCE. 2002 Digest of Technical Papers. International Conference on , vol., No., pp. 264-265, Jun. 2002.*

Primary Examiner—Nasser Moazzami
Assistant Examiner—Travis Pogmore
(74) Attorney, Agent, or Firm—Birch, Stewart, Kolasch & Birch, LLP.

(57) ABSTRACT

In a digital recording apparatus including a data control circuit 2a, a memory 4, an encryption circuit 5, an interface 6, a DVD drive 8, and a CPU 3, when encryption is required during recording, data is temporarily stored in the memory 4. After the encryption circuit 5 is enabled, the data is encrypted and recording by the DVD drive 8 on a recording medium is resumed. Thus, it is possible to make the encryption circuit operate only when recording a program requiring a content protection and to perform recording or reproducing from the required timing without interrupting the recording or reproducing even during start-up of the encryption circuit.

9 Claims, 11 Drawing Sheets

U.S. PATENT DOCUMENTS

| | | | | |
|---|---|---|---|---|
| 5,392,351 A | * | 2/1995 | Hasebe et al. | 705/51 |
| 7,230,898 B1 | * | 6/2007 | Yokota et al. | 369/53.21 |

FOREIGN PATENT DOCUMENTS

| JP | 8-306133 A | 11/1996 |
|---|---|---|
| JP | 2001-76431 A | 3/2001 |
| JP | 2001-77802 A | 3/2001 |
| JP | 2002-64482 A | 2/2002 |
| JP | 2002-344440 A | 11/2002 |

* cited by examiner

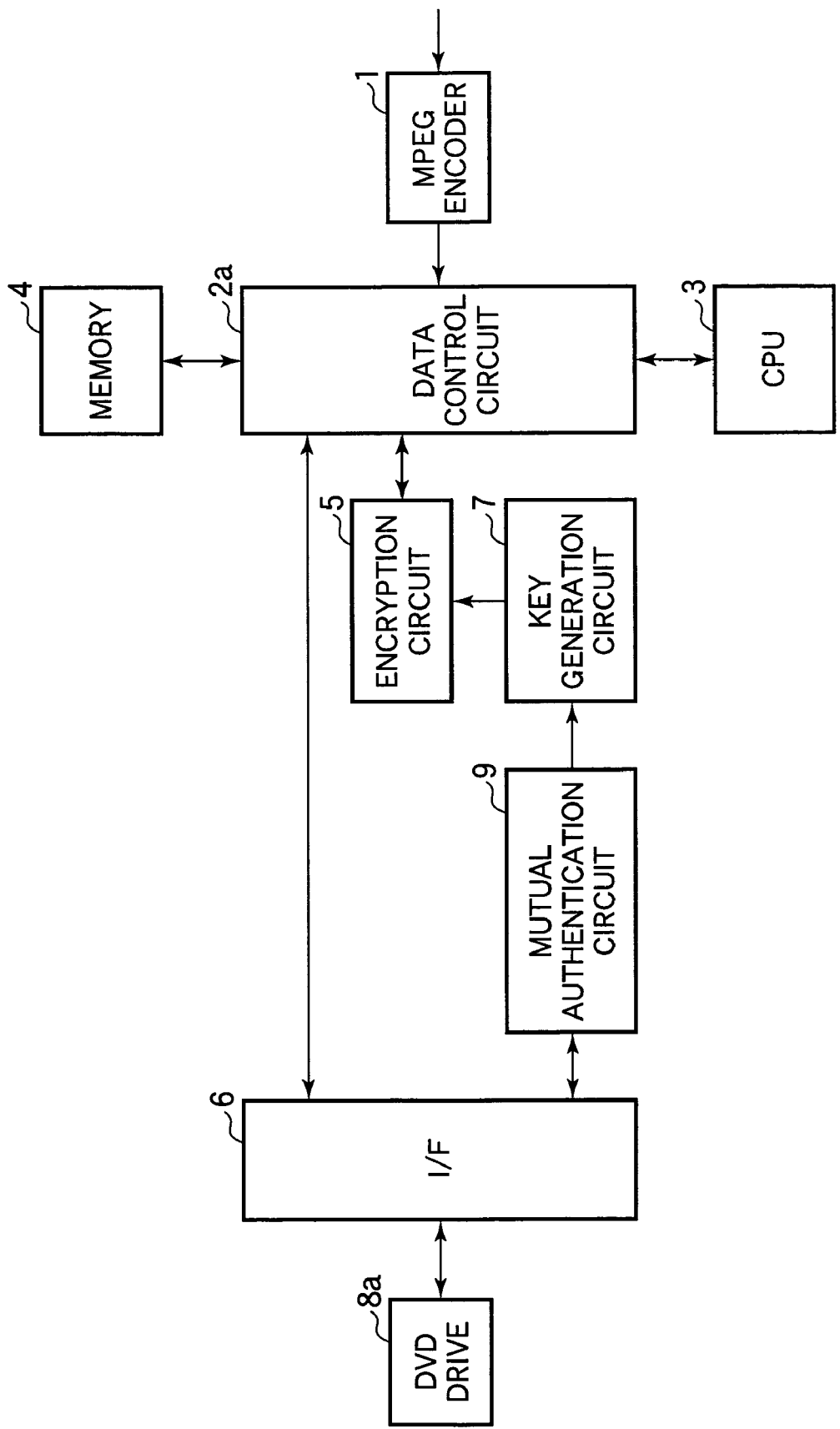

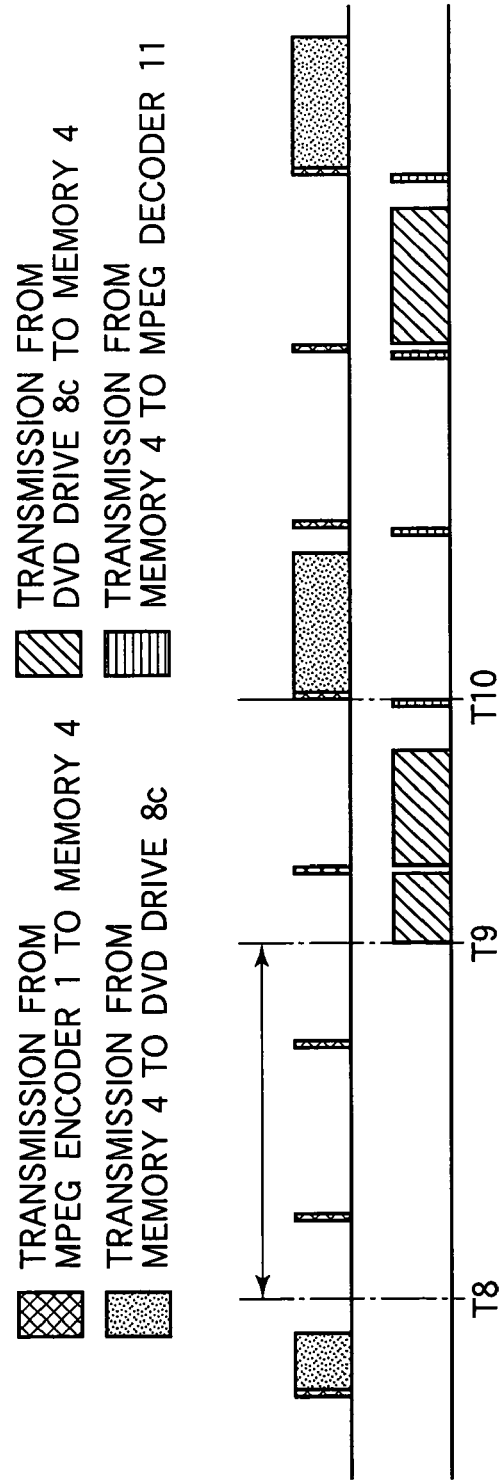
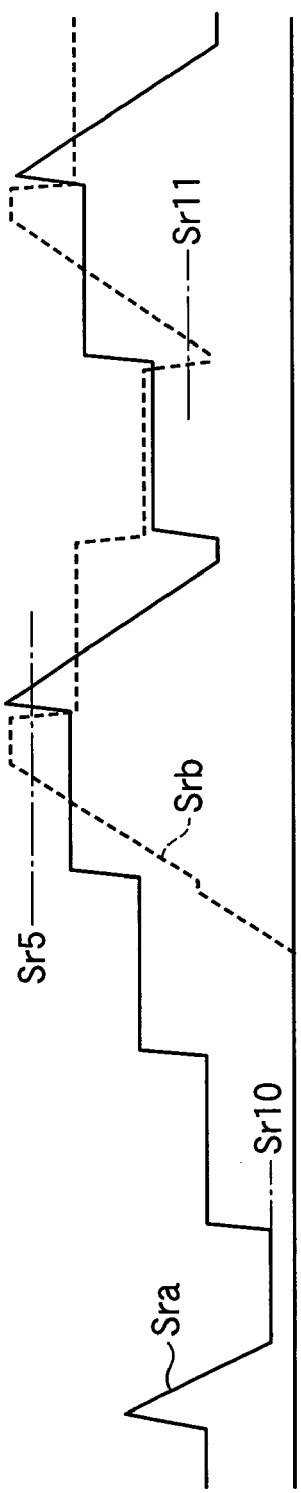
FIG.6A
FIG.6B

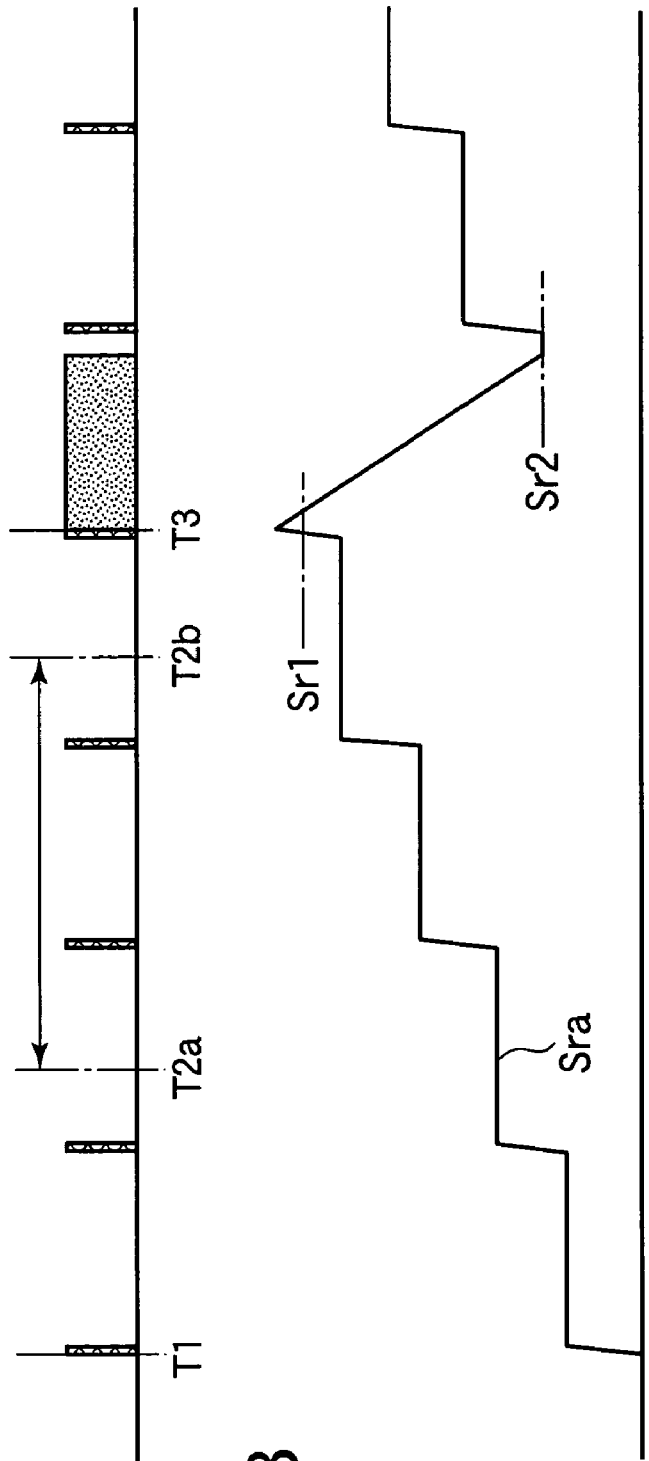

DIGITAL RECORDING DEVICE, DIGITAL REPRODUCTION DEVICE, DIGITAL RECORDING/REPRODUCTION DEVICE, ENCRYPTION DEVICE, DECRYPTION DEVICE, ENCRYPTION METHOD, AND DECRYPTION METHOD

TECHNICAL FIELD

The present invention relates to a digital recording apparatus, a digital reproducing apparatus, and a digital recording/reproducing apparatus, which record or reproduce video information, audio information and the other data on or from a hard disk, an optical disk or a memory, and an encryption apparatus, a decryption apparatus, an encryption method, and a decryption method.

BACKGROUND ART

When a video signal is recorded from a TV tuner, a video camera and the like, an operator operates a record button at a desired point in time. However, since it takes a specified period of time to start up a digital recording apparatus, recording is begun in a specified period of time after the operator operates the record button. To avoid this problem, there is proposed a method for recording a video signal once in a memory until the start-up is completed and recording the data stored in the memory onto a recording medium after the start-up is completed (see, for example, patent document 1).

Patent document 1: Japanese Patent Kokai (Laid-Open) Publication No. 08-306133 (pp. 2 to 4 and FIGS. 1 to 3)

DISCLOSURE OF THE INVENTION

Problems to be Solved by the Invention

The above-mentioned method is a measure at a time of start-up in the recording/reproducing of a signal that does not need to be encrypted, and is intended entirely for data that does not need to be encrypted.

Recently, there are also programs, contents of which need to be protected in order to protect the copyrights. As to these programs, a digital recording signal needs to be encrypted and recorded on a recording medium, and the digital recording signal needs to be read from the recording medium and then to be decrypted. At present, most of programs do not need to protect their contents and hence if an encryption circuit and a decryption circuit can be activated only when necessary, power consumption can be reduced. In this case, there is a problem that when data needs to be encrypted or decrypted (decoded) because of particularly changing a program or the like in the process of recording or reproducing, a program cannot be recorded or reproduced during start-up of the encryption circuit or the decryption circuit because it takes a specified period of time to start up the encryption circuit or the decryption circuit.

The present invention has been made to solve the above-mentioned problem. The object of the present invention is to provide a digital recording apparatus, a digital reproducing apparatus, and a digital recording/reproducing apparatus, which can record or reproduce data from a time when a request is made regardless of whether or not the data needs to be encrypted or decrypted, and an encryption apparatus, a decryption apparatus, an encryption method, and a decryption method.

Means for Solving the Problems

The present invention is a digital recording apparatus including: a data control circuit which receives a digital recording signal; a memory which is capable of communicating information with the data control circuit; an encryption circuit which is capable of communicating information with the data control circuit, the encryption circuit encrypting the digital recording signal; a recording unit which is controlled by the data control circuit, the recording unit recording the digital recording signal on a recording medium; and a recording signal processing circuit which causes the data control circuit to control transmission of the digital recording signal. When the digital recording signal needs to be encrypted, the encryption circuit begins to start up and the digital recording signal is transmitted from the data control circuit to the memory to be stored in the memory during start-up of the encryption circuit. When the encryption circuit becomes capable of operation, the digital recording signal stored in the memory is transmitted via the data control circuit to the encryption circuit and is encrypted by the encryption circuit to be recorded in the recording unit.

Further, the present invention is a digital reproducing apparatus including: a reproducing unit which reproduces a digital recording signal from a recording medium; a data control circuit which controls the reproducing unit and outputs a reproduced digital recording signal; a memory which is capable of communicating information with the data control circuit; a decryption circuit which is capable of communicating information with the data control circuit, the decryption circuit decrypting the digital recording signal; and a recording signal processing circuit which causes the data control circuit to control transmission of the digital recording signal. When the digital recording signal encrypted and recorded on the recording medium needs to be decrypted and reproduced, during start-up of the decryption circuit, the digital recording signal having been stored before start-up of the decryption circuit is outputted via the data control circuit. When the decryption circuit is capable of operation, the digital recording signal read by the reproducing unit is transmitted via the data control circuit to the decryption circuit and is decrypted by the decryption circuit to be outputted.

An encryption apparatus of the present invention includes: a storage unit which stores a digital signal; an encryption unit which encrypts the digital signal; an encryption key generation unit which generates an encryption key for enabling the encryption unit; a determination unit which determines whether or not the digital signal needs to be encrypted by the encryption unit; and a control unit which controls the storage unit and the encryption unit in such a way that when the determination unit determines that the digital signal does not need to be encrypted, the digital signal is not encrypted by the encryption unit and the digital signal stored in the storage unit is outputted, and when the determination unit determines that the digital signal needs to be encrypted, the digital signal from a time of the determination to a time when the enabling of the encryption unit is completed by the encryption key is stored in the storage unit and is encrypted by the encryption circuit to be outputted after the enabling of the encryption unit is completed.

A decryption apparatus of the present invention includes: a storage unit which stores a digital signal; a decryption unit which decrypts an encrypted signal of the digital signal; an encryption key generation unit which generates an encryption key for enabling the decryption unit; a determination unit which determines whether or not the digital signal needs to be decrypted by the decryption unit; and a control unit which controls the storage unit and the decryption unit in such a way that when the determination unit determines that the digital signal does not need to be decrypted, the digital signal is not decrypted by the decryption unit and the digital signal stored in the storage unit is outputted, and when the determination unit determines that the digital signal needs to be decrypted, the digital signal from a time of the determination to a time when the enabling of the decryption unit is completed by the encryption key is stored in the storage unit and is decrypted by the decryption circuit to be outputted after the enabling of the decryption unit is completed.

Furthermore, an encryption method of the present invention includes the steps of: storing a digital signal; encrypting the digital signal; generating an encryption key for enabling a function of encrypting the digital signal; and determining whether or not the digital signal needs to be encrypted. When the determination is that the digital signal does not need to be encrypted, the digital signal is not encrypted and the stored digital signal is outputted. When the determination is that the digital signal needs to be encrypted, the digital signal from a time of the determination to a time when the function of encrypting is enabled is stored and is encrypted to be outputted after the enabling of the function of encrypting is completed.

Moreover, a decryption method of the present invention includes the steps of: storing a digital signal; decrypting an encrypted digital signal of the digital signal; generating an encryption key for enabling a function of decrypting the digital signal; and determining whether or not the digital signal needs to be decrypted. When the determination is that the digital signal does not need to be decrypted, the digital signal is not decrypted and the stored digital signal is outputted. When the determination is that the digital signal needs to be decrypted, the digital signal from a time of the determination to a time when the function of decrypting is enabled is stored and is decrypted to be outputted after the enabling of the function of decrypting is completed.

Advantage of the Invention

In the case where a program is changed from one program that does not need to be encrypted to another program that needs to be encrypted, the digital recording apparatus, the encryption apparatus, and the encryption method of the present invention enable the encryption circuit only when encryption is required without interrupting recording and can record data during a period of time from a time when the program that does not need to be encrypted is switched to the program that needs to be encrypted to a time when the above-mentioned recording/reproducing unit is ready to record an encrypted signal, on the above-mentioned recording medium. Therefore, they can record the program from a time when the operator operates a record button regardless of whether or not a program needs to be encrypted.

Moreover, in the case where switching to data that needs to be decrypted is caused in the process of reproducing, the digital reproducing apparatus, the decryption apparatus, and the decryption method of the present invention can continuously reproduce data without interrupting reproducing data also during a period of time from a time when the switching is caused to a time when the decryption circuit is enabled.

BRIEF DESCRIPTION OF THE DRAWINGS

FIG. 1 is a system diagram showing one embodiment of a digital recording apparatus;

FIGS. 6A and 6B show diagrams indicating data transition in a memory in one embodiment of a digital recording/reproducing apparatus;

FIGS. 8A and 8B show diagrams indicating data transition in a memory in another embodiment of a digital recording apparatus;

DESCRIPTION OF REFERENCE NUMERALS

Figures 2A, 2B:
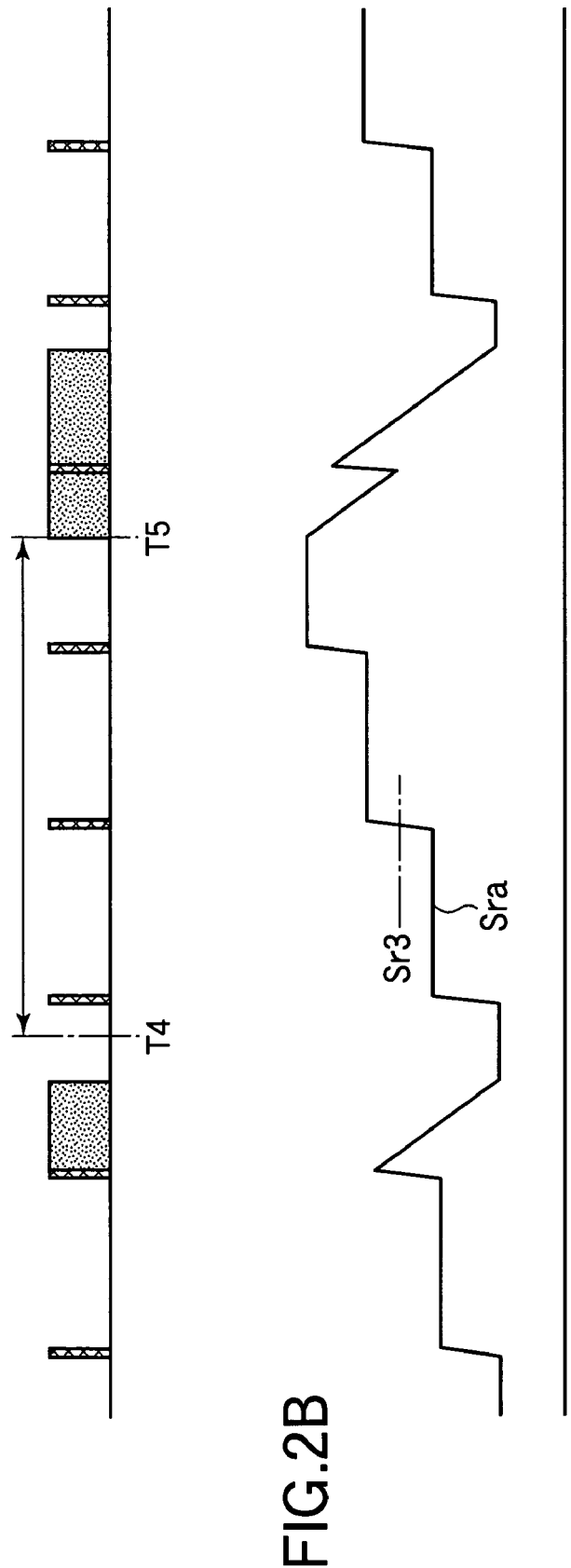
FIGS. 2A and 2B show diagrams indicating data transition in a memory in one embodiment of a digital recording apparatus.

1 MPEG encoder, 2*a* first data control circuit,
2*b* second data control circuit,
2*c* third data control circuit, 3 CPU, 4 memory,
5 encryption circuit, 6 interface,
7 encryption key generation circuit, 8*a*-8*c* DVD drive,
9 mutual authentication circuit, 10 decryption circuit, 11 MPEG decoder, 12 selector, 13 selector

BEST MODE FOR CARRYING OUT THE INVENTION

First Embodiment

FIG. 1 is a system diagram showing one embodiment of a digital recording apparatus according to the present invention. A digital recording signal encoded by an MPEG encoder 1 is inputted to a first data control circuit 2*a*. The first data control circuit 2*a* is controlled by a CPU 3 which is a recording signal processing circuit. Moreover, the first data control circuit 2*a* is electrically connected to a memory 4 (storage unit) that is a storage unit for storing a digital signal, an encryption circuit 5 for encrypting a digital signal, and an interface (I/F) 6. The encryption circuit 5 is electrically connected to an encryption key generation circuit 7 for generating an encryption key required to enable the encryption circuit 5. The first data control circuit 2*a* can control a DVD drive 8*a* as a recording unit via the interface 6 to record information on a recording medium (not shown in the figure). The DVD drive 8*a* may have both a recording function and a reproducing function. The mutual authentication circuit 9 is electrically connected to the interface 6 and the encryption key generation circuit 7 and performs mutual authentication with the DVD drive 8a via the interface 6. Specifically, the DVD drive 8a and the mutual authentication circuit 9 perform the mutual authentication, in which each of the DVD drive 8a and the mutual authentication circuit 9 confirms that the other is a regular device. Thereafter, the DVD drive 8a reads the information of the base of an encryption key, which is the individual information of the recording medium, from the recording medium, encrypts the read information, and sends the encrypted information to the mutual authentication circuit 9 in order to prevent information from leaking to somewhere else by the interface 6 and from being decrypted. The mutual authentication circuit 9 decrypts the encrypted information of the base of an encryption key and transmits the information to the encryption key generation circuit 7. The encryption key generation circuit 7 generates an encryption key from the information of the base of an encryption key and transmits the encryption key to the encryption circuit 5.

Hereinafter, the generation of the encryption key will be described in detail. In a recording medium such as a DVD disk, the information of the base of an encryption key is recorded in a management information area where management information is recorded. When information to be encrypted is recorded in the recording medium, content information is encrypted by the use of an encryption key generated from the information of the base of the encryption key recorded in the recording medium and then recorded. Meanwhile, when the encrypted information is reproduced from the recording medium, the encrypted information is decrypted by the use of an encryption key generated from the information of the base of an encryption key recorded in the recording medium and then reproduced. There is a possibility that when the information of the base of an encryption key is read from the recording medium and is passed through the interface 6, the information will be read and deciphered. Therefore, the information of the base of an encryption key is encrypted by an encryption key for key transfer (hereinafter referred to as a "bus key for key transfer") and then transmitted. The bus key for key transfer is generated by the mutual authentication, in which each of the DVD drive 8a and the mutual authentication circuit 9 confirms that the other is a regular device. When a DVD disk is put into the DVD drive 8a, the DVD drive 8a sends a prototype (A) of the bus key that the DVD drive 8a itself has to the mutual authentication circuit 9. The DVD drive 8a and the mutual authentication circuit 9 compute the bus key (A) independently of each other from the prototype (A) of this bus key. The mutual authentication circuit 9 transfers the bus key (A) of computation result to the DVD drive 8a and the DVD drive 8a compares result computed by the DVD drive 8a itself to verify that the same bus keys (A) are generated. Next, a prototype (B) of the bus key that the mutual authentication circuit 9 itself has is transferred from the mutual authentication circuit 9 to the DVD drive 8a and then the computation is performed in a similar manner and the mutual authentication circuit 9 verifies that the bus keys (B) that they mutually compute agree with each other. In this manner, when it is verified that the bus keys (A) agree each other and that the bus keys (B) agree each other, the DVD drive 8a and the mutual authentication circuit 9 generate the above-mentioned bus keys for key transfer from the bus key (A) and the bus key (B), respectively. Next, to generate an encryption key from the information of the base of an encryption key on the recording medium, the DVD drive 8a encrypts the information of the base of an encryption key on the recording medium by the bus key for key transfer and sends the encrypted information to the mutual authentication circuit 9. The mutual authentication circuit 9 decrypts the received information by the use of the bus key for key transfer to thereby make the information of the base of an encryption key. The key generation circuit 7 generates an encryption key from this information of the base of an encryption key. This encryption key is transmitted to the encryption circuit 5, whereby the encryption circuit 5 is brought to an active state.

By the way, since processing relating to copy management needs to be performed as to the recording medium such as a DVD, and hence the recording medium is obliged to encrypt and record a digital recording signal of a program, copyright of which needs to be protected and is allowed to record the digital recording signal once by a CGMS (Copy Generation Management System). The CGMS signal is included in a part of a video signal and it is determined by the CPU 3 whether or not the digital recording signal needs to be encrypted.

However, most of programs of analog broadcasting broadcast by common terrestrial waves are programs, copyrights of which do not need to be protected by the CGMS. When such programs are recorded, the programs may be recorded on the recording medium without being encrypted by the encryption circuit 5. However, when a program that does not need to be encrypted is switched in the middle of being recorded to a program that needs to be encrypted, the encryption circuit 5 needs to be enabled to encrypt the program and the encrypted program needs to be recorded on the recording medium by the DVD drive 8a.

An operation will be described. FIGS. 2A and 2B show diagrams indicating data transition in the memory 4 in one embodiment of a digital recording apparatus according to the present invention. FIG. 2A shows data flowing through the first data control circuit 2a and FIG. 2B shows a change in an amount Sra of data of a recording area in the memory 4 in time series. When a recording medium is put into the apparatus by an operator, the CPU 3 gives the DVD drive 8a a start-up command via the first data control circuit 2a and the interface 6. The DVD drive 8a begins rotating the recording medium and sets various servos and reads information necessary for recording data on the recording medium. Thereafter, the DVD drive 8a informs the CPU 3 of the completion of preparation via the first data control circuit 2a. Then, when a request of recording a program, copyright of which does not need to be protected by the CGMS is made, the CPU 3 instructs the MPEG encoder 1 to encode a digital recording signal and to input it to the first data control circuit 2a. Each time the MPEG encoder 1 finishes encoding a specified amount of digital recording signals, the MPEG encoder 1 transfers data to an area in the memory 4 assigned for recording via the first data control circuit 2a. This data transfer is finished in a short time because data is transferred between memories at a transfer rate of several hundreds Mbit/sec or more. The data is transferred via the first data control circuit 2a and the interface 6 to the DVD drive 8a and is recorded on the recording medium of the DVD drive 8a. Since a rate at which the DVD drive 8a writes data to the recording medium is approximately several tens Mbit/sec and hence writing data to the recording medium takes several times as long as a period required to transfer data to the memory 4.

When a program being recorded is switched at a time T4 in midstream to a program that needs to be encrypted, the CPU 3 determines from the CGMS that the program needs to be encrypted and instructs the interface 6 via the first data control circuit 2a to temporarily stop reading data from the memory 4 and recording data on the recording medium. However, since there are no instructions for the MPEG encoder 1 to stop encrypting data, the data of digital recording signal is continuously stored in an area in the memory 4 assigned for recording. At this time, as to the vacant capacity of the recording area in the memory 4, in order to prevent overflow during a period of time until the encryption circuit 5 is enabled, an amount of data in the recording area in the memory 4 needs to surely be not more than Sr3. When the vacant capacity of the recording area in the memory 4 surely is not more than Sr3, data is continuously recorded on the recording medium from the memory 4 and when sufficient vacant capacity is secured, writing data to the recording medium is stopped.

During a period of time after a determination point in time when it is determined that the data needs to be encrypted until the enabling of the encryption circuit 5 is completed by the encryption key, as described above, the DVD drive 8a and the mutual authentication circuit 9 perform mutual authentication and read the information of the base of an encryption key from the recording medium, and the encryption key generation circuit 7 generates an encryption key from the information and the encryption circuit 5 is enabled by the encryption key.

When the encryption circuit 5 is enabled, the DVD drive 8a can record encrypted data. When the encryption circuit 5 is enabled at a time T5, the data stored in the memory 4 is transferred via the first data control circuit 2a to the encryption circuit 5, is encrypted by the encryption circuit 5, and is returned again via the first data control circuit 2a to an area in the memory 4 assigned for recording. Further, the data is outputted from an area in the memory 4 assigned for writing via the first data control circuit 2a to the interface 6 at a recording rate at which the DVD drive 8a can write data, and the DVD drive 8a restarts recording data on the recording medium. However, the data of the program that does not need to be encrypted remains in the memory 4 at this moment and hence the data that does not need to be encrypted is not encrypted.

At this time, since an amount of data in the memory 4 at a time T4 when a program being recorded is switched to a program that needs to be encrypted is not more than Sr3, assuming that the bit rate of encoding by the MPEG encoder 1 is x Mbit/sec and that the capacity of the recording area in the memory 4 is C1, a relationship formula of $$C1 \geq x \times (T5-T4) + Sr3$$

needs to be satisfied. That is, when it is determined that a program needs to be encrypted, it is necessary to control an amount Sr3 of data in the memory 4 at a time T4 of determination to an amount of satisfying the above-mentioned relationship formula. In other words, the vacant capacity in the memory 4 needs to be not less than the capacity of storing the digital signal during a period of time after the determination point in time when it is determined that a program needs to be encrypted until the enabling of the encryption circuit 5 is completed by the encryption key.

In this regard, when an amount Sr3 of data in the memory 4 is not secured at a time T4 of the determination when it is determined that a program needs to be encrypted, the operation of recording data that does not need to be encrypted from the memory 4 on the recording medium is continuously performed and when sufficient vacant capacity is secured, the operation of recording data on the recording medium is stopped. Therefore, strictly speaking, an amount Sr3 of data in the memory 4 does not need to be secured at the above-mentioned point T4 but may be secured at a time which is after a time T4 and when the recording operation is stopped.

Several to several tens kilobytes of capacity is large enough for the capacity of an area in the memory 4 assigned for writing because data is recorded at once by the DVD drive 8a.

Therefore, when a program being recorded by the DVD drive 8a is switched to a program that needs to be encrypted, a digital signal during a period of time after the CPU 3 determines that the program needs to be encrypted until the enabling of the encryption circuit 5 is completed by an encryption key can be stored in the memory 4, and after the encryption circuit 5 is enabled, the digital signal can be encrypted and recorded on the DVD drive 8a. As a result, regardless of whether or not data to be recorded needs to be encrypted, always from a time when a request is made, the data can be recoded on the recording medium such as a writing optical disk and a rewritable optical disk.

Second Embodiment

Figure 3:
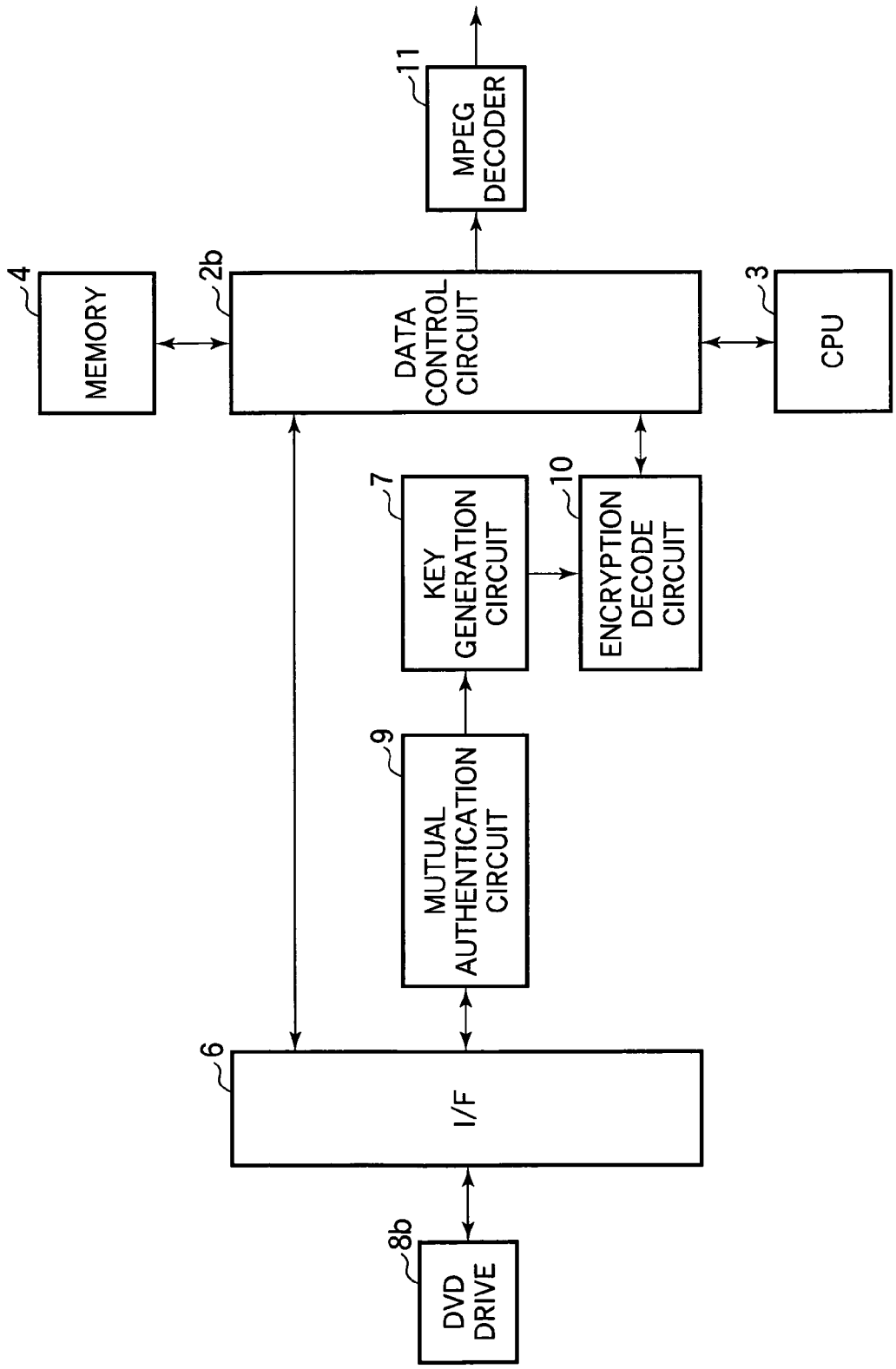
FIG. 3 is a system diagram showing one embodiment of a digital reproducing apparatus.

FIG. 3 is a system diagram of one embodiment of a digital reproducing apparatus according to the present invention. In the second embodiment, as compared with the first embodiment, there is provided a second data control circuit 2b which is capable of outputting a digital recording signal in place of the first data control circuit 2a; a DVD drive 8b in place of the DVD drive 8a is a reproduction-only one; and in place of the encryption circuit 5, a decryption circuit 10 is electrically connected to the encryption key generation circuit 7 and the second data control circuit 2b. When the decryption circuit 10 has an encryption key transferred from the encryption key generation circuit 7, just as with the encryption circuit 5, the decryption circuit 10 is enabled and can decrypt an encrypted digital recording signal. Moreover, in place of the MPEG encoder 1 in the first embodiment, an MPEG decoder 11 is electrically connected to the second data control circuit 2b and the digital recording signal is decoded by the MPEG decoder 11 via the second data control circuit 2b. The DVD drive 8b may be such that has both of a recording function and a reproducing function.

Figures 4A, 4B:
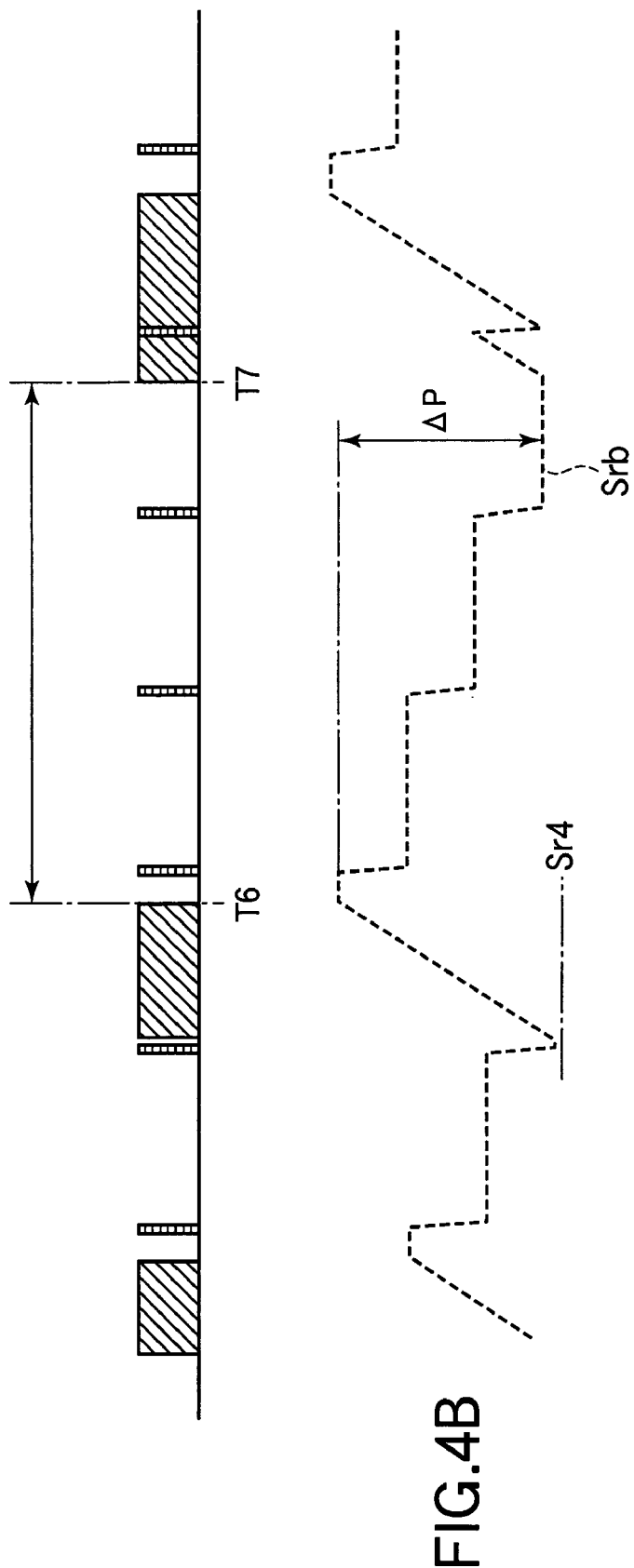
FIGS. 4A and 4B show diagrams indicating data transition in a memory in one embodiment of a digital reproducing apparatus.

An operation will be described. FIGS. 4A and 4B indicate diagrams showing the data transition in the memory 4 in one embodiment of the digital reproducing apparatus according to the present invention. FIG. 4A shows data flowing through the second data control circuit 2b in time series and FIG. 4B shows a change in an amount Srb of data of an area in the memory 4 for reading in time series. There will be described the operation when a digital recording signal that is not encrypted is switched to a digital recording signal that is encrypted while data is being read from the recording medium.

When the DVD drive 8b reads data that is not encrypted from the recording medium, the data of the recording medium of the DVD drive 8b is recorded in an area in the memory 4 assigned for reading via the interface 6 and the second data control circuit 2b. At this time, it is determined by the CPU 3 that this data is data that is not encrypted and hence thereafter the data is outputted from the memory 4 via the second data control circuit 2b to the MPEG decoder 11.

When the CPU 3 recognizes at a time T6 that the data is a program that needs to be decrypted, the CPU 3 instructs the interface 6 via the second data control circuit 2b to temporarily stop reading data from the DVD drive 8b to the memory 4. However, a video decoded by the MPEG decoder 11 is being reproduced and hence, to prevent the video from being stopped on a display, the digital recording signal is continuously delivered from the memory 4 to the MPEG decoder 11. At this time, as to the capacity of the area in the memory 4 assigned for reading, in order to continuously deliver the digital recording signal during a period of time until the enabling of the decryption circuit 10 is completed, an amount of data in the area in the memory 4 assigned for reading needs to be not less than an amount Sr4 of data. Assuming that an amount of data to be continuously outputted to the MPEG decoder 11 during a period of time from a time T6 to a time T7 is ΔP, a relationship formula of ΔP≦Sr4 needs to be satisfied. That is, when it is determined that the data needs to be decrypted, it is necessary to control an amount Sr4 of data in the memory 4 at a time T6 of determination to over an amount of data that satisfies the above-mentioned relationship formula, that is, is outputted during a period of time after a time T6 of the determination until the enabling of the decryption circuit 10 is completed by an encryption key. This is because if Sr4 is not more than ΔP, an amount of data of the digital recording signal in the area in the memory 4 assigned for reading becomes 0 during process of enabling the decryption circuit 10 and hence reproduction cannot be performed. Here, the digital signal outputted during a period of time until the enabling of the decryption circuit 10 is completed by the encryption key is a signal that does not need to be decrypted.

While the reading of data from the recording medium is stopped, the DVD drive 8b and the mutual authentication circuit 9 perform mutual authentication and then the information of the base of an encryption key is read from the DVD drive 8b and an encryption key is generated by the encryption key generation circuit 7 and the decryption circuit 10 is enabled by the encryption key. When the decryption circuit 19 is enabled at a time T7, the data read after that a time from the DVD drive 8b is once stored in the area in the memory 4 assigned for reading and then is transferred via the second data control circuit 2b to the decryption circuit 10, is decrypted by the decryption circuit 10, then is again transferred via the second data control circuit 2b, and is once stored in an area in the memory 4 assigned for reproducing. Thereafter, the decrypted digital recording signal is decoded and outputted by the MPEG decoder 11.

Therefore, even when a program is switched in the middle of being read from the DVD drive 8b to a program that needs to be decrypted, the digital signal already stored in the memory 4 can be outputted during a period of time after the determination point in time when the CPU 3 determines that the program needs to be decrypted until the enabling of the decryption circuit 10 is completed by the encryption key, and then after the enabling of the decryption circuit 10 is completed, the data read from the DVD drive 8b can be decrypted and outputted. As a result, regardless of whether or not the recording data needs to be decrypted, the data can be reproduced from the recording medium such as a reproduction-only optical disk always from a time when a request is made.

Third Embodiment

In recent years, the recording/reproducing bit rate of a DVD drive is improved, and recording and reproducing can be performed on and from the same disk at the same time. This includes a case where a program being now recorded is reproduced and a case where another program different from a program being now recorded is reproduced. In a case where another program different from a program being now recorded is reproduced, there is a case where recording a program that does not need to be encrypted is started first and then an encrypted program is reproduced.

Figure 5:
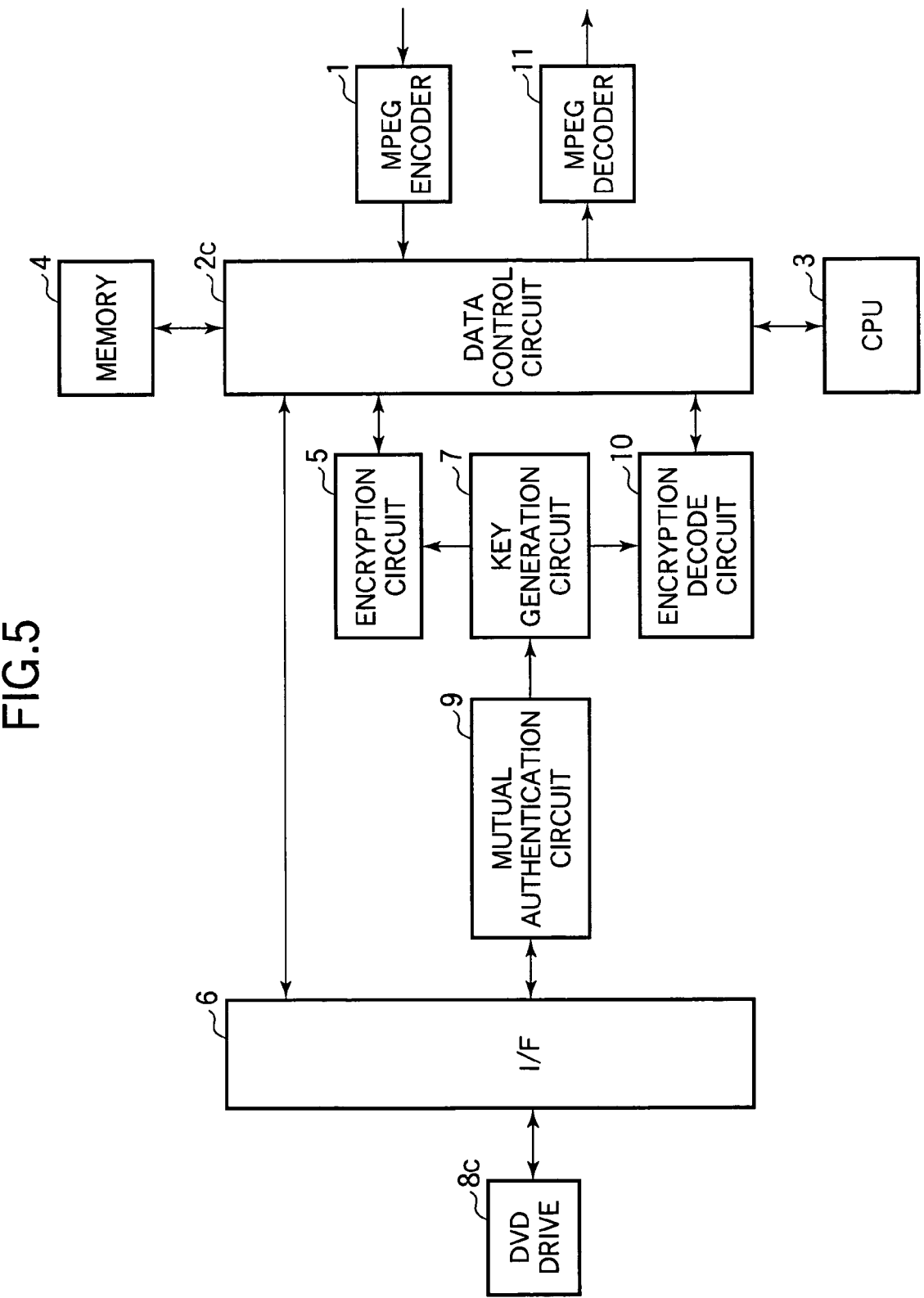
FIG. 5 is a system diagram showing one embodiment of a digital recording/reproducing apparatus.

FIG. 5 is a system diagram showing one embodiment of a digital recording/reproducing apparatus according to the present invention. As compared with the first embodiment, the first digital control circuit 2a is replaced by a third data control circuit 2c, to or from which a digital recording signal can be inputted or outputted and which has both of functions of the first data control circuit 2a and the second data control circuit 2b, and the DVD drive 8a is replaced by a DVD drive 8c capable of recording and reproducing data. In addition to the case of the first embodiment, the decryption circuit 10 is electrically connected to the encryption key generation circuit 7 and the third data control circuit 2c. When the decryption circuit 10 has received an encryption key transferred from the encryption key generation circuit 7 just as with the encryption circuit 5, the decryption circuit 10 is enabled and can decrypt the encrypted digital recording data. Moreover, the digital recording signal is transferred via the third data control circuit 2c to the MPEG decoder 11 and is decoded by the MPEG decoder 11. With regard to the other points, the third embodiment is the same as the first and second embodiments.

An operation will be described. FIGS. 6A and 6B show the data transition in the memory 4 in one embodiment of the digital recording/reproducing apparatus according to the present invention. FIG. 6A shows data flowing through the third data control circuit 2c, and FIG. 6B shows a change in an amount Sra of data of an area for recording and a change in an amount Srb of data of an area for reading in the memory 4 in time series.

Before a time T8, a program that does not need to be encrypted is recorded. When a request of reproducing an encrypted program recorded in the recording medium is made at a time T8, the CPU 3 instructs the third data control circuit 2c to interrupt the transfer of the digital recording data to the DVD drive 8c. At this time, the digital recording signal to be recorded is continuously flowed and hence the data of the encoded digital recording signal is continuously stored in an area in the memory 4 assigned for recording from the MPEG encoder 11 just as with the case before recording being interrupted.

In order to enable the decryption circuit 10 in this interim, the DVD drive 8c and the mutual authentication circuit 9 perform mutual authentication and then read the information of the base of an encryption key, and an encryption key is generated by the key generation circuit 7. The decryption circuit 10 is enabled by the generated encryption key and then the DVD drive 8c starts to read data from the recording medium at a time T9. The read data is transferred via the third data control circuit 2c to the memory 4 and is once stored in the area in the memory 4 assigned for reading and then is again transferred via the third data control circuit 2c to the decryption circuit 10. The data decrypted by the decryption circuit 10 is again transferred via the third data control circuit 2c to the memory 4 and is stored in an area in the memory 4 assigned for reproducing. Further, when a specified amount of data is stored, the data is transferred to the MPEG decoder 11 that decodes the encoded data.

When an amount Sra of data of an area in the memory 4 assigned for recording exceeds a specified amount Sr5 of data at a time T10 after a time T9 when the decryption circuit 10 is enabled, the stored data is transferred via the third data control circuit 2c to the interface 6 and writing the data to the recording medium by the DVD drive 8c is restarted.

At this time, assuming that an amount Sra of encoded data for recording, which remains in the memory 4 just before temporarily stopping transferring the data to the DVD drive 8c, is Sr10, that a bit rate at which data is encoded by the MPEG encoder 1 is x, that a period from a time when reproduction is started to a time when the DVD drive 8c records data next time is (T10−T8), and that a capacity in the memory 4 assigned for recording is C2, a relationship formula of $$C2 > Sr10 + x \times (T10 - T8)$$

needs to be satisfied.

Thereafter, the DVD drive 8c reads a specified amount of data and then writes the data to the recording medium each time an amount Sra of data of an area in the memory 4 assigned for recording is more than a specified amount Sr5 of data, and reads data from the recording medium each time an amount Srb of data of an area in the memory 4 assigned for reproducing becomes less than Sr11.

Therefore, even when a request of reproducing a program that needs to be encrypted is made while the DVD drive 8c is recording a program that does not need to be encrypted, a digital signal for recording can be stored in the memory 4 during process of enabling the decryption circuit 10 and, after the enabling of the decryption circuit is completed, data read from the DVD drive 8c can be decrypted and reproduced, and at the same time can be recorded on the recording medium in the DVD drive 8c. As a result, regardless of whether or not the recording data needs to be encrypted, even in the process of recording data on the recording medium, the data can be reproduced always from a time when a request of reproducing is made.

Fourth Embodiment

In the third embodiment, there has been described a case where the encryption circuit 10 is enabled, and then reproduces the encrypted program in the middle of recording a program that does not need to be encrypted. However, a case will be described below where the encryption circuit 5 is enabled, and then records the data in the middle of reproducing a program that is not encrypted. The configuration of the digital recording/reproducing apparatus of this embodiment is the same as the configuration shown in FIG. 5 of the third embodiment.

Figure 7A:
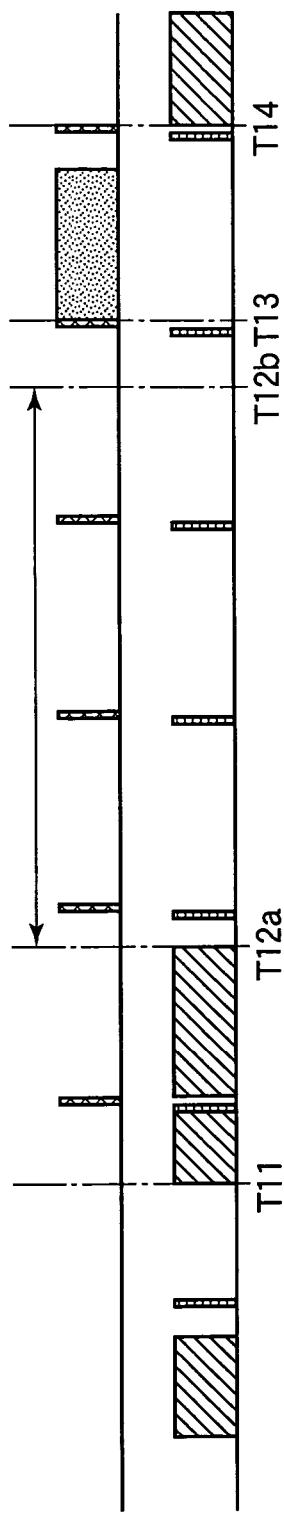
FIGS. 7A and 7B show diagrams indicating data transition in a memory in another embodiment of a digital recording/reproducing apparatus.
Figure 7B:
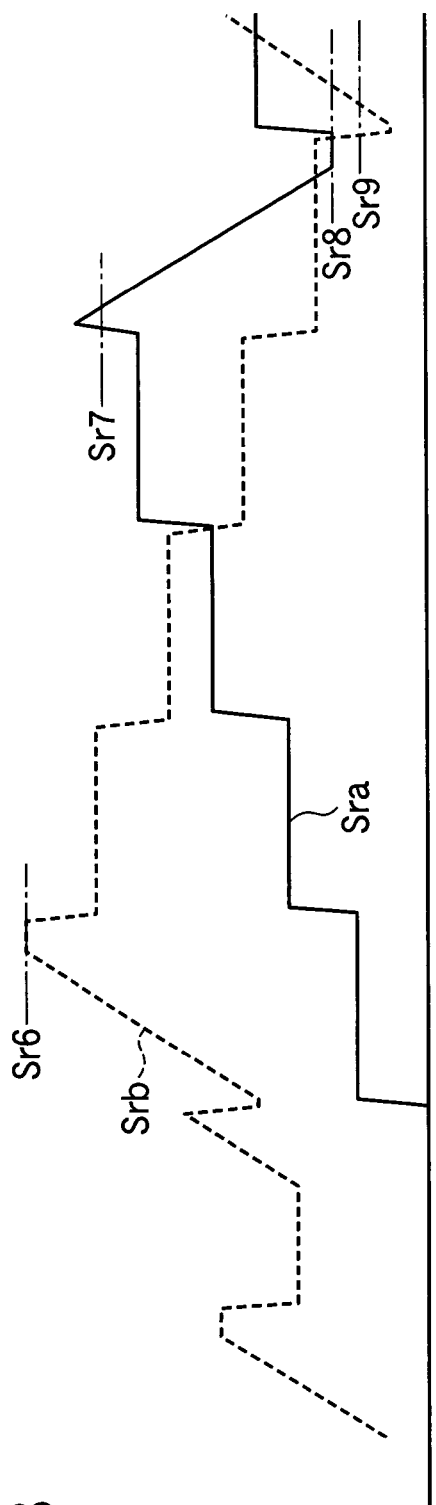

An operation will be described. FIGS. 7A and 7B show the data transition in the memory 4 in another embodiment of a digital recording/reproducing apparatus according to the present invention. FIG. 7A shows data flowing through the third data control circuit 2c and FIG. 7B shows a change in an amount Sra of data for recording and a change in an amount Srb of data for reproducing in the memory 4 in time series.

When a request of recording data is made at a time T11 in the middle of reproducing a program that is not encrypted, the CPU 3 instructs the MPEG encoder 1 to start to encode data and starts to transfer the data to an area in the memory 4 assigned for recording. Since a video data cannot be reproduced from the recording medium during process of enabling the encryption circuit 5, the enabling of the encryption circuit 5 is started after a time T12a when an amount Sr6 of data large enough for continuously reproducing the video on the display is stored in an area in the memory 4 assigned for reproducing. The DVD drive 8c and the mutual authentication circuit 9 perform mutual authentication and then the key generation circuit 7 generates an encryption key from such information of the base of an encryption key that is recorded in the recording medium and the encryption circuit 5 is enabled at a time T12b on the basis of this encryption key.

The flowing of data for recording the video and the reproducing of the video on the display need to be continuously performed even during process of enabling the encryption circuit 5, and hence the writing of the digital recording signal encoded by the MPEG encoder 1 to an area in the memory 4 assigned for recording is continuously performed. Moreover, the data in the area in the memory 4 assigned for reading is continuously supplied to the MPEG decoder 11. When an amount of data in the area assigned for recording is more than a specified amount Sr7 at a time T13 after a time T12b when the enabling of the encryption circuit 5 is completed, the stored data is transferred via the third data control circuit 2c to the encryption circuit 5 and is encrypted by the encryption circuit 5. Further, the data is transferred via the third data control circuit 2c to the memory 4 and is again stored in an area in the memory 4 assigned for writing and then is again transferred via the third data control circuit 2c to the interface 6 and then the writing of the data to the recording medium is started by the DVD drive 8c. The writing of the data to the recording medium is continuously performed until an amount of data for recording decreases to Sr8. Further, when an amount of data in the area assigned for reproducing is less than Sr9, the DVD drive 8c again starts to read data from the recording medium.

As described just now, the reproducing of data from the recording medium cannot be performed during process of enabling the encryption circuit 5 and during a period of time until the data stored in an area in the memory 4 assigned for recording is written to the recording medium. Therefore, it is necessary to start the enabling of the encryption circuit 5 after an amount Sr6 of data enough to continuously reproduce the video on the display for these periods of time is stored in the area assigned for reproducing. Here, assuming that the bit rate of encoding the reproducing data is y Mbps, an amount Sr6 of data to be stored needs to satisfy a relationship formula of $$Sr6 > (T14 - T12a) \times y.$$

Moreover, assuming that a capacity to be secured at a minimum in an area in the memory 4 assigned for recording is C3 and that a time when the recoding of data on the recording medium is restarted is T13, a relationship formula of $$C3 > (T13 - T11) \times x$$

needs to be satisfied.

Therefore, even when a request of recording a program that needs to be encrypted is made while the DVD drive 8c is reproducing a program that does not need to be encrypted, a digital signal for recording can be stored in the memory 4 during process of enabling the encryption circuit 5 and after the enabling of the encryption circuit is completed, the digital signal can be encrypted and data can be recoded and at the same time data in the recording medium of the DVD drive 8c can be reproduced. As a result, regardless of whether or not recording data needs to be encrypted, data can be recorded or reproduced on and from the recording medium always from a time when the request is made.

Fifth Embodiment

In the first embodiment, in the case where a request of recording is made just after a recording medium is inserted into an apparatus by an operator, it takes a certain measure of time to activate the DVD drive 8a. There is a case where a request of recording a program, copyrights of which need to be protected, is made in an initial start-up of the DVD drive 8a. This case will be described below.

A digital recording apparatus in the fifth embodiment is the same as that in the first embodiment and is the same as that shown in FIG. 1.

An operation will be described. FIGS. 8A and 8B indicate diagrams showing the data transition in a memory in another embodiment of a digital recording apparatus according to the present invention. FIG. 8A shows data flowing through the first data control circuit 2a, and FIG. 8B shows a change in the amount Sra of data of a recording area in the memory 4 in time series.

When a recording medium is put into the apparatus by the operator, the CPU 3 gives the DVD drive 8a a start-up command via the first data control circuit 2a and the interface 6. The DVD drive 8a starts rotating the recording medium, sets various servos, and reads information necessary for recording and reproducing data on and from the recording medium. After that the DVD drive 8a notifies the CPU 3 of the completion of preparation via the interface 6 and the first data control circuit 2a. When the operator makes a request of recording data that needs to be encrypted at a time T1 while the above-mentioned action is being performed, the CPU 3 instructs the MPEG encoder 1 to encode a digital recording signal and to input it to the first data control circuit 2a. At this time, the CPU 3 determines by the CGMS that the digital recording signal needs to be encrypted. Each time the MPEG encoder 1 finishes encoding a specified amount of data, the MPEG encoder 1 transfers data via the first data control circuit 2a to an area in the memory 4 assigned for recording. This data transfer is finished in a short time because data is transferred between memories at a transfer rate of several hundreds Mbit/sec or more. Thereafter, the data encoded by the MPEG encoder 1 is continuously stored in the memory 4 until the preparation of recording by the DVD drive 8a is completed.

When the start-up of the DVD drive 8a is completed at a time T2a, the enabling of the encryption circuit 5 is started, and is finished at a time T12b. This makes it possible for the DVD drive 8a to record also the encrypted data. The encoded data is continuously stored in the memory 4 also for the duration of time.

When an amount of data stored in an area in the memory 4 assigned for recording becomes not less than a specified amount Sr1 after a time T2b when the preparation of recording by the DVD drive 8a is finished, data is transferred via the first data control circuit 2a to the encryption circuit 5, is encrypted by the encryption circuit 5, and then is returned again via the first data control circuit 2a to an area in the memory 4 assigned for writing. Thereafter, immediately the recording of data on the recording medium by the DVD drive 8a from the interface 6 via the first data control circuit 2a to the DVD drive 8a is started.

The recording of data on the recording medium is performed via the interface 6 and the DVD drive 8a until an area in the memory 4 assigned for recording becomes not larger than a specified capacity Sr2. The writing rate of data on the recording medium by the DVD drive 8a is approximately several tens Mbit/sec and hence the recording of data on the recording medium takes several times as long as the time required to transfer data to the memory 4. Assuming that the bit rate of encoding by the MPEG encoder 1 is x Mbit/sec and that a time when writing data to a magneto-optical disk starts is T3, the required minimum capacity C4 of the recording area in the memory 4 needs to satisfy a relationship formula of $$C4 > x \times (T3 - T1).$$

Moreover, several to several tens kbyte of capacity is adequate for the area in the memory 4 assigned when data is once transferred to the memory 4 from the encryption circuit 5, because data is immediately recorded on the recording medium by the DVD drive 8a.

The encoded digital recording signal is continuously outputted from the MPEG encoder 1 also after the DVD drive 8a becomes capable of recording data. Since the writing rate of data to the recording medium is faster than the rate of outputting of data by the MPEG encoder 1, the memory 4 does not overflow as shown in FIG. 8B. The writing of data to the recording medium is not performed until the area in the memory assigned for recording 4 again reaches a specified capacity. Each time the area exceeds a specified capacity, data is written in a lump.

Therefore, even when a request of recording a program that needs to be encrypted is made during process of the start-up of the DVD drive 8a, during process of the start-up of the DVD drive 8a and during process of enabling the encryption circuit 5, data can be stored in the memory 4. After the enabling of the encryption circuit 5 is completed, data can be encrypted and recorded in the DVD drive 8a. As a result, even a program that needs to be encrypted can be recorded from a time when a request of recording is made.

Sixth Embodiment

The same function and effect as in the first and fifth embodiments can be obtained by the case of another configuration that is different from that of the system diagram shown in FIG. 1 and described in the first and fifth embodiments. Hereinafter, the description with reference to this case will be made.

Figure 9:
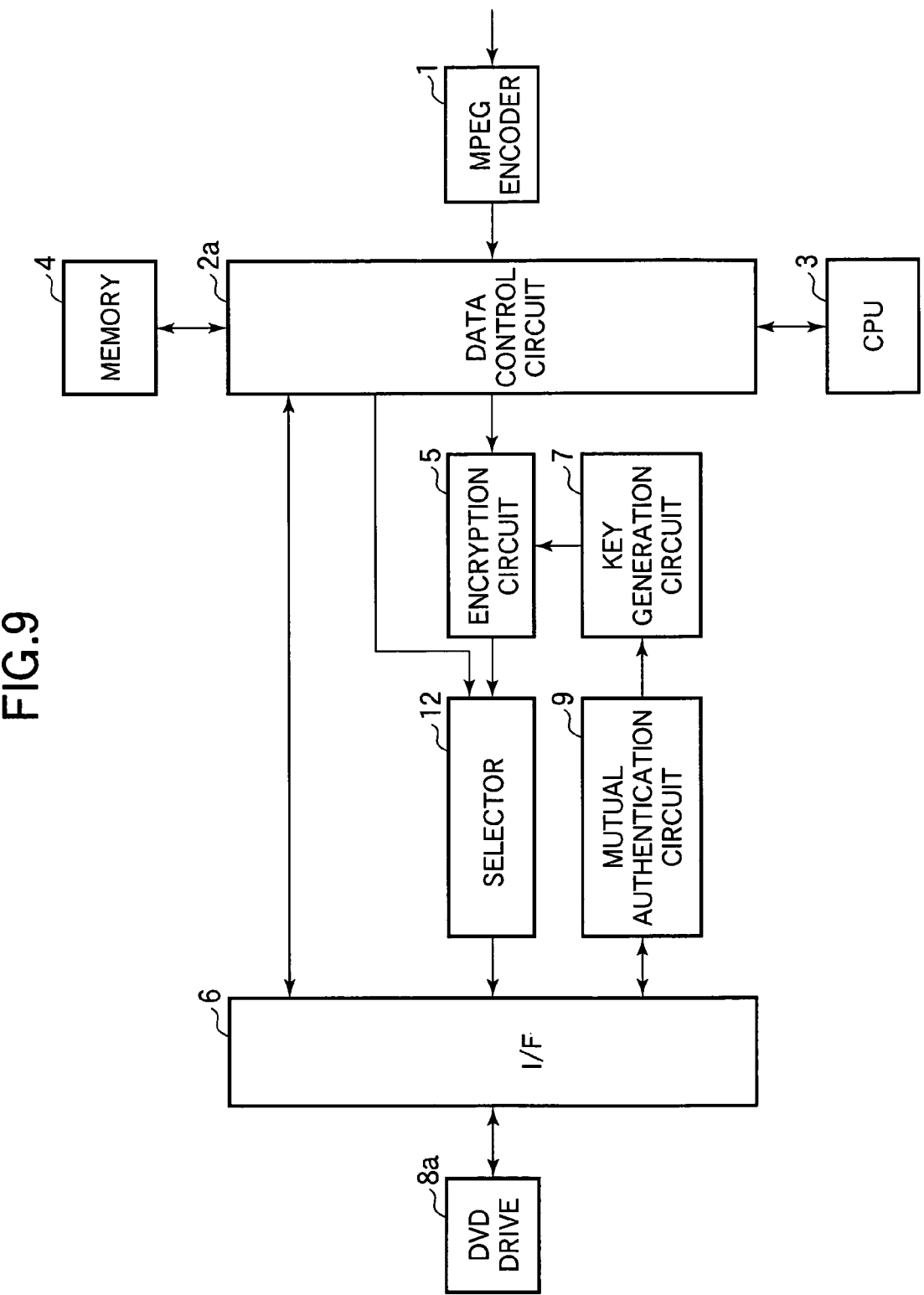
FIG. 9 is a system diagram showing another embodiment of a digital recording apparatus.

FIG. 9 is a system diagram showing another embodiment of a digital recording apparatus according to the present invention. A description of this figure will be made with reference to different points from the system diagram shown in FIG. 1 of the first embodiment. Although information could be transmitted between the first data control circuit 2a and the encryption circuit 5 bidirectionally, information can be transmitted only from the first data control circuit 2a to the encryption circuit 5 in the sixth embodiment. Moreover, both of the first data control circuit 2a and the encryption circuit 5 can transmit information to the selector 12. The selector 12 can select data from the first control circuit 2a or data from the encryption circuit 5 to transmit information to the interface 6.

Moreover, since data and the like other than encoded data are always outputted from the first data control circuit 2a to the interface 6, when an information transmitting line for data that is encrypted is made to meet an information transmitting line for data that is not encrypted without providing the selector 12, data collides with each other to break the circuit. Therefore, the selector 12 is provided at the meeting point of the information transmitting line for data that is encrypted and the information transmitting line for data that is not encrypted.

An operation will be described. Basically, the operation is the same as the operation in the first and fifth embodiments and different parts of the operation will be described.

In the case of a program that does not need to be encrypted, in the first embodiment, data that is not encrypted is transferred from the memory 4 via the first data control circuit 2a to the interface 6, whereas in the sixth embodiment, data that is not encrypted is once transferred from the memory 4 via the first data control circuit 2a to the selector 12 and then after the selector 12 selects data that is not encrypted, the data is transferred to the interface 6. Moreover, in the case of a program that needs to be encrypted, in the first embodiment, data is encrypted by the encryption circuit 5 and then the encrypted data is returned via the first data control circuit 2a to an area in the memory 4 assigned for writing and then is outputted via the first data control circuit 2a to the interface 6, whereas in the sixth embodiment, data is encrypted by the encryption circuit 5 and then the encrypted data is once transferred to the selector 12 and after the selector 12 selects the encrypted data, the encrypted data is transferred to the interface 6.

Therefore, after data is encrypted by the encryption circuit 5, the encrypted data is not returned via the first data control circuit 2a to an area in the memory 4 assigned for writing and hence an area in the memory 4 assigned for writing does not need to be secured. Moreover, since an amount of data per unit time passing through the first data control circuit 2a becomes small, a data transfer rate can be made slower than in the first and fifth embodiments, which results in reducing the size of the system and further reducing power consumption.

Seventh Embodiment

The same function and effect as in the second embodiment can be obtained by the case of another configuration that is different from that of the system diagram shown in FIG. 3 and described in the second embodiment. Hereinafter, the description with reference to this case will be made.

Figure 10:
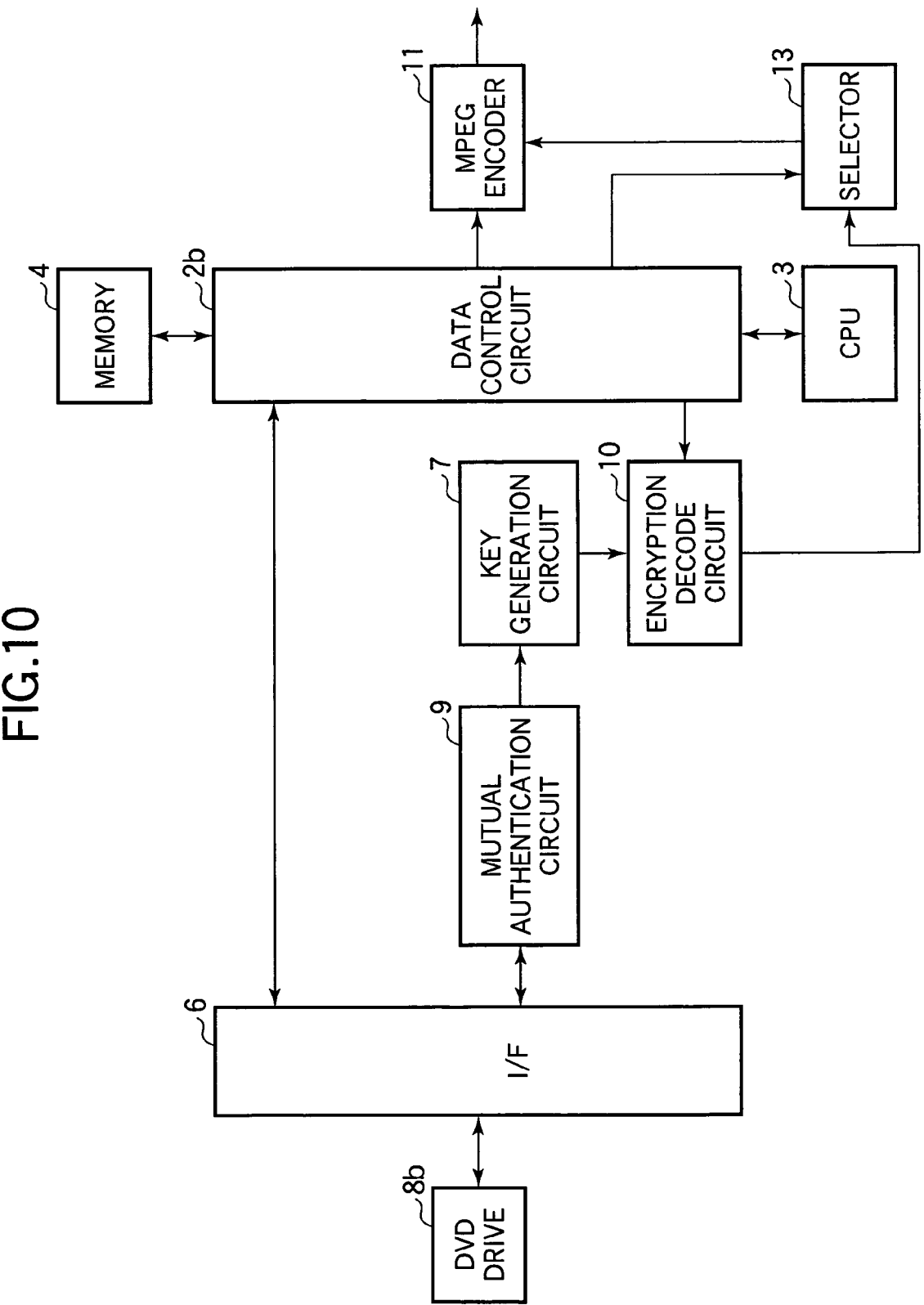
FIG. 10 is a system diagram showing another embodiment of a digital reproducing apparatus.

FIG. 10 is a system diagram showing another embodiment of a digital reproducing apparatus according to the present invention. A description of this figure will be made with reference to different points from the system diagram shown in FIG. 3 of the second embodiment. Although information could be transmitted between the second data control circuit 2b and the decryption circuit 10 bidirectionally, information can be transmitted only from the second data control circuit 2b to the decryption circuit 10 in the seventh embodiment. Moreover, both of the second data control circuit 2b and the decryption circuit 10 can transmit information to the selector 13. The selector 13 can select data from the second control circuit 2c or data from the decryption circuit 10 to transmit information to the MPEG decoder 11.

Moreover, since data and the like other than encoded data are always outputted from the second data control circuit 2b to the MPEG decoder 11, when an information transmitting line for data that is decrypted is made to meet an information transmitting line for data that is not decrypted without providing the selector 13, data collides with each other to break the circuit. Therefore, the selector 13 is provided at the meeting point of the information transmitting line for data that is decrypted and the information transmitting line for data that is not decrypted.

An operation will be described. Basically, the operation is the same as the operation in the second embodiment and different parts of the operation will be described.

In the case of a program that does not need to be decrypted, in the second embodiment, data that does not need to be decrypted is transferred from the memory 4 via the second data control circuit 2b to the MPEG decoder 11, whereas in the seventh embodiment, data that does not need to be decrypted is once transferred from the second data control circuit 2b to the selector 13 and then after the selector 13 selects the data that does not need to be decrypted, the data is transferred to the MPEG decoder 11. Moreover, in the case of a program that needs to be decrypted, in the second embodiment, data is decrypted by the decryption circuit 10, and then the decrypted data is returned via the second data control circuit 2b to an area in the memory 4 assigned for reproducing and further is outputted via the second data control circuit 2b to the MPEG decoder 11. In contrast to this, in the seventh embodiment, data is decrypted by the decryption circuit 10 and then the decrypted data is transferred to the selector 13, and after the selector 13 selects the decrypted data, the decrypted data is transferred to the MPEG decoder 11.

Therefore, after data is decrypted by the decryption circuit 10, since the decrypted data is not returned via the second data control circuit 2b to an area in the memory 4 assigned for reproducing, an area in the memory 4 assigned for reproducing does not need to be secured. Moreover, since an amount of data per unit time passing through the second data control circuit 2b becomes small, a data transfer rate can be made slower than in the second embodiment, which results in reducing the size of the system and further reducing power consumption.

Eighth Embodiment

The same function and effect as in the third and fourth embodiments can be obtained by the case of another configuration that is different from that of the system diagram shown in FIG. 5 and described in the third and fourth embodiments. Hereinafter, the description with reference to this case will be made.

Figure 11:
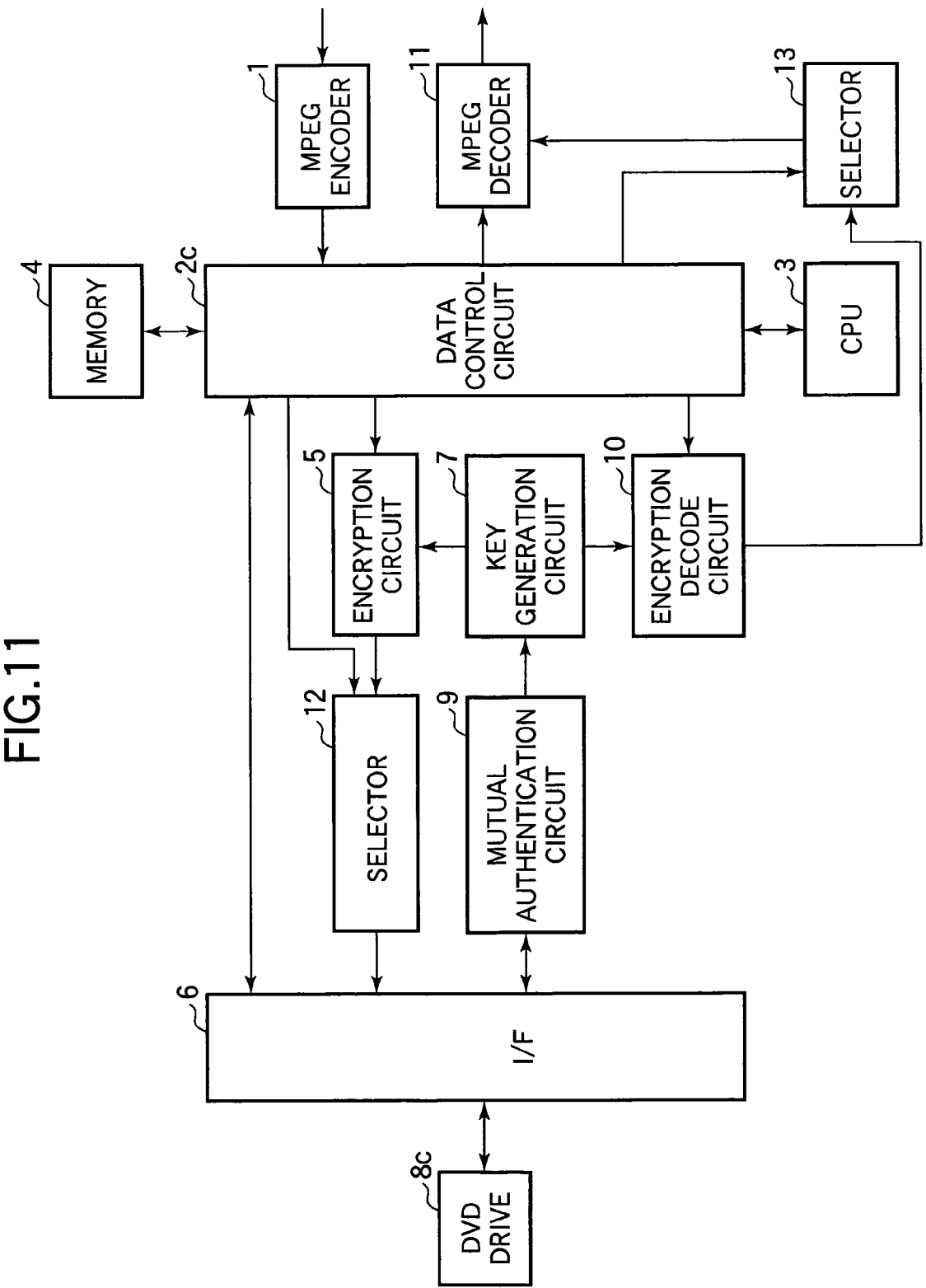
FIG. 11 is a system diagram showing another embodiment of a digital recording/reproducing apparatus.

FIG. 11 is a system diagram showing another embodiment of a digital recording/reproducing apparatus according to the present invention. A description of this figure will be made with reference to different points from the system diagram shown in FIG. 5 of the third embodiment.

In the recording side, although information could be transmitted between the third data control circuit 2c and the encryption circuit 5 bidirectionally, information can be transmitted only from the third data control circuit 2c to the encryption circuit 5 in the eighth embodiment. Moreover, both of the third data control circuit 2c and the encryption circuit 5 can transmit information to the selector 12. The selector 12 can select data from the third control circuit 2c or data from the encryption circuit 5 to transmit information to the interface 6.

In the reproducing side, although information could be transmitted between the third data control circuit 2c and the decryption circuit 10 bidirectionally, information can be transmitted only from the third data control circuit 2c to the decryption circuit 10 in the eighth embodiment. Moreover, both of the third data control circuit 2c and the decryption circuit 10 can transmit information to the selector 13. The selector 13 can select data from the third control circuit 2c or data from the decryption circuit 10 to transmit information to the MPEG decoder 11.

An operation will be described. Basically, the operation is the same as the operation in the third and fourth embodiments. The different parts of the operation in the case of recoding are the same as those in the sixth embodiment. The different parts in the case of reproducing are the same as those in the seventh embodiment.

Therefore, after data is encrypted by the encryption circuit 5, the encrypted data is not returned via the third data control circuit 2c to an area in the memory 4 assigned for writing. Hence the area in the memory 4 for writing does not need to be secured. Moreover, since an amount of data per unit time passing through the third data control circuit 2c becomes smaller, a data transfer rate can be made slower than that in the third and fourth embodiments, which results in reducing the size of the system and further reducing power consumption.

Moreover, after data is decrypted by the decryption circuit 10, the decrypted data is not returned via the third data control circuit 2c to an area in the memory 4 assigned for reproducing. Hence the area in the memory 4 for reproducing does not need to be secured. Moreover, since an amount of data per unit time passing through the third data control circuit 2c becomes smaller, a data transfer rate can be made slower than that in the third and fourth embodiments, which results in reducing the size of the system and further reducing power consumption.

In the first to eighth embodiments, the descriptions have been made on the precondition that mutual authentication is performed between the DVD drives 8a to 8c and the mutual authentication circuit 9. However, when both are connected to each other by a local interface or when the integration of an LSI is advanced to integrate an LSI for the DVD drive 8a to 8c and an LSI for signal processing side into one piece, there is no need for performing mutual authentication and hence, in this case, the mutual authentication circuit 9 is not necessary. Moreover, although the cases where the MPEG encoder 1 and the MPEG decoder 11 are used for encoding and decoding data have been described, encoders and decoders of other types can be employed, and when encoding is not necessary, it is not necessary to provide an encoder and a decoder.

Furthermore, the DVD recorder (recording apparatus) or the DVD player (reproducing apparatus) has been described in the first to eighth embodiments, but the present invention can be applied also to a recording apparatus and a reproducing apparatus using a hard disk or a semiconductor memory.

INDUSTRIAL APPLICABILITY

According to a digital recording apparatus, a digital reproducing apparatus, a digital recording/reproducing apparatus, an encryption apparatus, a decryption apparatus, an encryption method, and a decryption method of the present invention, regardless of whether or not data needs to be encrypted or decrypted, recording or reproducing can be performed smoothly always from when a request is made.

The invention claimed is:

1. A digital recording apparatus comprising:
   a data control circuit which receives a digital recording signal;
   a memory which is capable of communicating information with the data control circuit;
   an encryption circuit which is capable of communicating information with the data control circuit, the encryption circuit encrypting the digital recording signal, the encryption circuit being deactivated before the data control circuit receives the digital recording signal to be encrypted;
   a recording unit which is controlled by the data control circuit, the recording unit recording the digital recording signal on a recording medium; and
   a recording signal processing circuit which causes the data control circuit to control transmission of the digital recording signal;
   wherein when the digital recording signal needs to be encrypted, the encryption circuit begins to start up and the digital recording signal is transmitted from the data control circuit to the memory to be stored in the memory during start-up of the encryption circuit, and when the encryption circuit becomes capable of operation, the digital recording signal stored in the memory is transmitted via the data control circuit to the encryption circuit and is encrypted by the encryption circuit to be recorded in the recording unit, and
   when the digital recording signal needs to be encrypted, the memory secures a vacant capacity larger than a capacity capable of storing the digital recording signal from a time when the digital recording signal needs to be encrypted to a time when the encryption circuit becomes capable of operation.

2. A digital reproducing apparatus comprising:
   a reproducing unit which reproduces a digital recording signal from a recording medium;
   a data control circuit which controls the reproducing unit and outputs a reproduced digital recording signal;
   a memory which is capable of communicating information with the data control circuit;
   a decryption circuit which is capable of communicating information with the data control circuit, the decryption circuit decrypting the digital recording signal, the decryption circuit being deactivated before the data control circuit receives the digital recording signal to be decrypted; and
   a recording signal processing circuit which causes the data control circuit to control transmission of the digital recording signal;
   wherein when the digital recording signal encrypted and recorded on the recording medium needs to be decrypted and reproduced, during start-up of the decryption circuit, the digital recording signal having been stored before start-up of the decryption circuit is outputted via the data control circuit, and when the decryption circuit is capable of operation, the digital recording signal read by the reproducing unit is transmitted via the data control circuit to the decryption circuit and is decrypted by the decryption circuit to be outputted, and
   when the digital recording signal needs to be decrypted, the amount of data of the digital recording signal stored is not less than an amount of data outputted from a time when the digital record signal needs to be decrypted to a time when the decryption unit is capable of operation.

3. A digital recording/reproducing apparatus comprising:
   the digital recording apparatus of claim 1; and
   a digital reproducing apparatus comprising:
      a reproducing unit which reproduces a digital recording signal from a recording medium;
      a data control circuit which controls the reproducing unit and outputs a reproduced digital recording signal;
      a memory which is capable of communicating information with the data control circuit;
      a decryption circuit which is capable of communicating information with the data control circuit, the decryption circuit decrypting the digital recording signal, the decryption circuit being deactivated before the data control circuit receives the digital recording signal to be decrypted; and
      a recording signal processing circuit which causes the data control circuit to control transmission of the digital recording signal;
      wherein when the digital recording signal encrypted and recorded on the recording medium needs to be decrypted and reproduced, during start-up of the decryption circuit, the digital recording signal having been stored before start-up of the decryption circuit is outputted via the data control circuit, and when the decryption circuit is capable of operation, the digital recording signal read by the reproducing unit is transmitted via the data control circuit to the decryption circuit and is decrypted by the decryption circuit to be outputted.

4. An encryption apparatus comprising:
   a storage unit which stores a digital signal;
   an encryption unit which encrypts the digital signal;
   an encryption key generation unit which generates an encryption key for enabling the encryption unit;
   a determination unit which determines whether or not the digital signal needs to be encrypted by the encryption unit, the encryption unit being deactivated before the determination unit determines that the digital signal needs to be encrypted; and a control unit which controls the storage unit and the encryption unit in such a way that when the determination unit determines that the digital signal does not need to be encrypted, the digital signal is not encrypted by the encryption unit and the digital signal stored in the storage unit is outputted, and when the determination unit determines that the digital signal needs to be encrypted, the digital signal from a time of the determination to a time when the enabling of the encryption unit is completed by the encryption key is stored in the storage unit and is encrypted by the encryption circuit to be outputted after the enabling of the encryption unit is completed, wherein when the determination unit determines that the digital signal needs to be encrypted, the storage unit secures a vacant capacity larger than a capacity capable of storing the digital signal from a time of the determination to a time when the enabling of the encryption unit is completed by the encryption key.

5. The encryption apparatus according to claim 4, wherein the encryption key is generated from information read from a recording medium for recording the digital signal.

6. A decryption apparatus comprising:

a storage unit which stores a digital signal;

a decryption unit which decrypts an encrypted signal of the digital signal;

an encryption key generation unit which generates an encryption key for enabling the decryption unit;

a determination unit which determines whether or not the digital signal needs to be decrypted by the decryption unit, the decryption unit being deactivated before the determination unit determines that the digital signal needs to be decrypted; and a control unit which controls the storage unit and the decryption unit in such a way that when the determination unit determines that the digital signal does not need to be decrypted, the digital signal is not decrypted by the decryption unit and the digital signal stored in the storage unit is outputted, and when the determination unit determines that the digital signal needs to be decrypted, the digital signal from a time of the determination to a time when the enabling of the decryption unit is completed by the encryption key is stored in the storage unit and is decrypted by the decryption circuit to be outputted after the enabling of the decryption unit is completed, wherein when the determination unit determines that the digital signal needs to be decrypted, the amount of data of the digital signal stored in the storage unit is not less than an amount of data outputted from a time of the determination to a time when the enabling of the decryption unit is completed by the encryption key.

7. The decryption apparatus according to claim 6, wherein the encryption key is generated from information read from a recording medium for recording the digital signal.

8. An encryption method comprising the steps of:

storing a digital signal;

encrypting the digital signal;

generating an encryption key for enabling a function of encrypting the digital signal; and determining whether or not the digital signal needs to be encrypted;

wherein when the determination is that the digital signal does not need to be encrypted, the digital signal is not encrypted and the stored digital signal is outputted, and when the determination is that the digital signal needs to be encrypted, the digital signal from a time of the determination to a time when the function of encrypting is enabled is stored and is encrypted to be outputted after the enabling of the function of encrypting is completed, and when the determination is that the digital signal needs to be encrypted, a vacant capacity larger than a capacity capable of storing the digital signal from a time of the determination to a time when the function of encrypting is enabled is secured.

9. A decryption method comprising the steps of:

storing a digital signal;

decrypting an encrypted digital signal of the digital signal;

generating an encryption key for enabling a function of decrypting the digital signal; and determining whether or not the digital signal needs to be decrypted;

wherein when the determination is that the digital signal does not need to be decrypted, the digital signal is not decrypted and the stored digital signal is outputted, and when the determination is that the digital signal needs to be decrypted, the digital signal from a time of the determination to a time when the function of decrypting is enabled is stored and is decrypted to be outputted after the enabling of the function of decrypting is completed, and when the determination is that the digital signal needs to be decrypted, the amount of data of the digital signal stored is not less than an amount of data outputted from a time of the determination to a time when the function of decrypting is enabled.

* * * * *